(12) United States Patent
Hurtta et al.

(10) Patent No.: US 9,319,242 B2
(45) Date of Patent: Apr. 19, 2016

(54) HANDLING TRAFFIC FLOWS IN A MOBILE COMMUNICATIONS NETWORK

(75) Inventors: Tuija Hurtta, Espoo (FI); Ralitsa Gateva, Helsinki (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 12/213,551

(22) Filed: Jun. 20, 2008

(65) Prior Publication Data

US 2008/0259865 A1 Oct. 23, 2008

Related U.S. Application Data

(62) Division of application No. 10/655,536, filed on Sep. 5, 2003.

(30) Foreign Application Priority Data

Apr. 30, 2003 (GB) .................................. 0309917.3

(51) Int. Cl.
*H04L 12/54* (2013.01)
*H04L 12/801* (2013.01)
*H04L 12/813* (2013.01)
*H04L 12/851* (2013.01)
(Continued)

(52) U.S. Cl.
CPC ............ *H04L 12/5695* (2013.01); *H04L 47/14* (2013.01); *H04L 47/18* (2013.01); *H04L 47/20* (2013.01); *H04L 47/245* (2013.01); *H04L 47/2441* (2013.01); *H04L 47/2458* (2013.01); *H04L 47/32* (2013.01); *H04L 47/748* (2013.01); *H04L 47/762* (2013.01); *H04L 47/801* (2013.01); *H04L 47/805* (2013.01); *H04L 47/808* (2013.01); *H04L 47/822* (2013.01); *H04L 47/824* (2013.01); *H04W 28/12* (2013.01)

(58) Field of Classification Search
CPC ....................................................... H04L 47/10
USPC ...................................................... 370/395.21
See application file for complete search history.

(56) References Cited

U.S. PATENT DOCUMENTS

| | | | | |
|---|---|---|---|---|
| 6,606,311 B1 * | 8/2003 | Wang et al. | ................... | 370/338 |
| 6,654,610 B1 * | 11/2003 | Chen et al. | ................... | 455/450 |
| 6,744,767 B1 * | 6/2004 | Chiu et al. | ............... | 370/395.21 |
| 7,209,437 B1 * | 4/2007 | Hodgkinson et al. | ......... | 370/230 |

(Continued)

FOREIGN PATENT DOCUMENTS

EP 152 571 A2 11/2001

OTHER PUBLICATIONS

3GPP: "3G TS 23.060" "3rd Generation Partnership Project; Technical Specification Group Services and System Aspects; General Packet Radio Service (GPRS); Service description; Stage 2"; Apr. 2000; pp. 1, 2, 85, 86.

*Primary Examiner* — Huy C Ho
(74) *Attorney, Agent, or Firm* — Mintz Levin Cohn Ferris Glovsky and Popeo, P.C.

(57) ABSTRACT

A method includes receiving a request for establishing a communication pathway end-to-end over a network. The communication pathway includes a radio communication channel and a packet communication channel. The request identifies a plurality of traffic flows to be carried by the communication pathway and quality-of-service attributes associated with the traffic flows. At least one traffic flow is associated with at least one quality-of-service attribute determining the quality-of-service requirement for the at least one traffic flow. A quality-of-service is negotiated, based on the quality-of-service attribute, and the negotiated quality-of-service is reported.

26 Claims, 9 Drawing Sheets

(51) Int. Cl.
*H04L 12/833* (2013.01)
*H04L 12/823* (2013.01)
*H04L 12/911* (2013.01)
*H04L 12/923* (2013.01)
*H04L 12/927* (2013.01)
*H04L 1/00* (2006.01)
*H04W 28/12* (2009.01)

(56) References Cited

U.S. PATENT DOCUMENTS

| | | | |
|---|---|---|---|
| 7,301,951 B2 * | 11/2007 | Chen et al. | 370/395.52 |
| 2002/0036983 A1 * | 3/2002 | Widegren et al. | 370/230.1 |
| 2002/0062379 A1 * | 5/2002 | Widegren et al. | 709/227 |
| 2003/0043786 A1 | 3/2003 | Kall et al. | |
| 2004/0013089 A1 | 1/2004 | Taneja et al. | |

* cited by examiner

HANDLING TRAFFIC FLOWS IN A MOBILE COMMUNICATIONS NETWORK

This is a Divisional patent application of U.S. patent application Ser. No. 10/655,536, filed on Sep. 5, 2003. The disclosure of the prior application is hereby incorporated by reference herein in its entirety.

BACKGROUND OF THE INVENTION

1. Field of the Invention

The invention relates to the handling of traffic flows in a mobile communications network, and in particular in a network which has access to an external packet data network such as the internet or any other packet-based system.

2. Description of the Related Art

Mobile communications systems refers generally to any telecommunications systems which enable a wireless communication when users are moving within the service area of the system. A typical mobile communications systems is a Public Land Mobile Network (PLMN).

Often the mobile communications network is an access network providing a user with a wireless access to external networks, hosts, or services offered by specific service providers. The user must have a subscribership with the mobile communications system in order to be able to use the services of the mobile system. Normally, in addition to the mobile subscribership, a separate subscribership is needed with each one of the other service providers whose services are accessed through the mobile communications network. The mobile subscriber data of the user may indicate which external service the user is authorized to use and to which access point or gateway node a service request should be routed. The access point or gateway node then provides further access to an external network or an external host. In this case the service request is routed on the basis of a service definition in the mobile subscriber data stored by a mobile network operator, and therefore there is no need for further authentication of the user by the gateway or the service provider.

It is, however, desirable that the user is able to select the service provider or the most suitable access point of the service provider. For example, the use of the TCP/IP (Transmission Control Protocol/Internet Protocol) data network, i.e. the Internet network has increased very rapidly. Before the user can connect to the Internet, he has to have a contract with an Internet service provider ISP, who provides access to the Internet via one or more Internet access points IAP.

The general packet radio service (GPRS) is a new service in the GSM system, and is one of the objects of the standardization work of the GSM phase 2+ at ETSI (European Telecommunication Standard Institute). The GPRS operation environment includes a number of packet data service nodes (SN), which in this application will be referred to as serving GPRS support nodes (SGSN), each of which is connected to the base station subsystem by way of base station controllers (BSC) in such a way that it can provide a packet service for mobile data terminals via several base stations, i.e. cells. The SGSN are in turn connected to an external data network, e.g. to a public switched data network (PSPDN), via GPRS gateway support nodes (GGSN). The GPRS services thus allow to provide packet data transmission between mobile data terminals and external data networks when the GPRS network functions as an access network.

In GPRS network the mobile station MS may optionally indicate, in a message requesting to activate a packet data protocol (PDP) context in the network, an access point name for selection of a reference point to a certain external network. A SGSN authenticates the mobile user and sends a PDP context creation request to a gateway node GGSN selected according to information stored in the subscriber data or according to the access point name given by the MS, or to default GGSN known by the SGSN.

In such a network, a PDP context is established to carry traffic flows over the network, each PDP context including a radio bearer provided between the mobile data terminal or user equipment and the radio network controller, a radio access bearer provided between the user equipment, the radio network controller and the SGSN, and switched packet data channel provided between the serving GPRS service node and the gateway GPRS service node. Each PDP context can carry more than one traffic flow, but all traffic flows within one particular PDP context are treated the same way as regards their transmission across the network. The PDP context treatment requirement is based on PDP context attributes, for example quality-of-service and/or charging attributes.

A PDP context is requested by the user equipment, and the GGSN requests quality-of-service (QoS) authorization from a policy decision function (PDF) in the network. Once authorization has been obtained, the GGSN proceeds with the PDP context activation. However, it can happen that the quality-of-service parameters are modified e.g. during set up of the radio bearer and radio access bearers due to the network environment, even after authorization for a particular treatment has been obtained. Another problem can arise in a situation where user equipment (UE) can request a bearer service with a QoS profile. The UE does not know specifically what QoS will be supported by the network. In the case that the network rejects the service with the requested bitrate, UE has to request the service again with a lower bitrate. This causes much signaling flow between the terminal and the network if the network rejects the requested QoS which is made by the UE all the time.

SUMMARY OF THE INVENTION

According to one embodiment of the invention, a method comprises receiving a request for establishing a communication pathway end-to-end over a network. The communication pathway includes a radio communication channel and a packet communication channel. The request identifies a plurality of traffic flows to be carried by the communication pathway and quality-of-service attributes associated with the traffic flows. At least one traffic flow is associated with at least one quality-of-service attribute determining the quality-of-service requirement for the at least one traffic flow. A quality-of-service is negotiated, based on the quality-of-service attribute, and the negotiated quality-of-service is reported.

In another embodiment, an apparatus according to the invention comprises a receiver configured to receive a request for establishing a communication pathway end-to-end over a network. The communication pathway can include a ratio communication channel and a packet communication channel. The request identifies a plurality of traffic flows to be carried by the communication pathway, and quality-of-service attributes associated with the traffic flows. At least one traffic flow is associated with at least one quality-of-service attribute determining the quality-of-service requirement for the at least one traffic flow. A negotiator is configured to negotiate quality-of-service based on the quality-of-service attributes. A reporter is configured to report the negotiated quality-of-service.

In yet another embodiment, an apparatus according to the invention comprises a receiver configured to receive negotiated quality-of-service for a plurality of traffic flows to be carried by an end-to-end communication pathway over a network. A forwarder is configured to forward the negotiated quality-of-service to an application proxy or application server.

In another embodiment, a method according to the invention comprises receiving negotiated quality-of-service at an application proxy or application server for a plurality of traffic flows to be carried by an end-to-end communication pathway over a network. The configuration of the application proxy or server is adjusted for sending and receiving the plurality of traffic flows.

In another embodiment, a receiver is configured to receive negotiated quality-of-service for a plurality of traffic flows to be carried by an end-to-end communication pathway over a network. An adjuster is configured to adjust the configuration of the apparatus for sending and receiving the plurality of traffic flows.

BRIEF DESCRIPTION OF THE DRAWINGS

For a better understanding of the invention and to show how the same may be carried into effect, reference will now be made by way of example to the accompanying drawings.

DETAILED DESCRIPTION OF THE PREFERRED EMBODIMENTS

Figure 1:
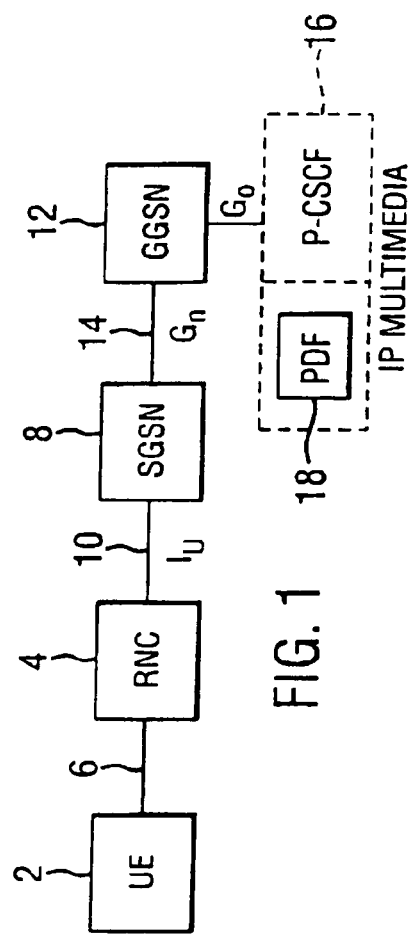
FIG. 1 is a schematic block diagram of a mobile communications network.

FIG. 1 illustrates the nodes of a network by way of background to the invention. Reference numeral 2 denotes user equipment UE, for example mobile stations. User equipment UE is in communication with a radio network controller 4 via radio network channels 6 which are referred to herein as radio bearers RB. These radio network channels are set up in a mobile telecommunications network in a known manner. Each user equipment UE can have one or more radio network channels open at any one time with the radio network controller 4, and there can of course be a number of user equipments in communication with the radio network controller by way of individual radio network channels as is well known in the art. The radio network controller is in communication with a SGSN 8 via an Iu interface 10. The SGSN 8 communicates with a gateway GPRS support node 12 via a $G_n$ or $G_p$ interface 14, which is a switched packet data interface. As is well known, the SGSN 8 and the GGSN 12 provide support for GPRS services in the network. The GGSN 12 is under the control of a policy decision function 18. The policy decision function may be stand-alone or may be combined with an application function such as a proxy connection state control function P-CSCF 16 of IP Multimedia Subsystem (IMS).

Figure 1A:
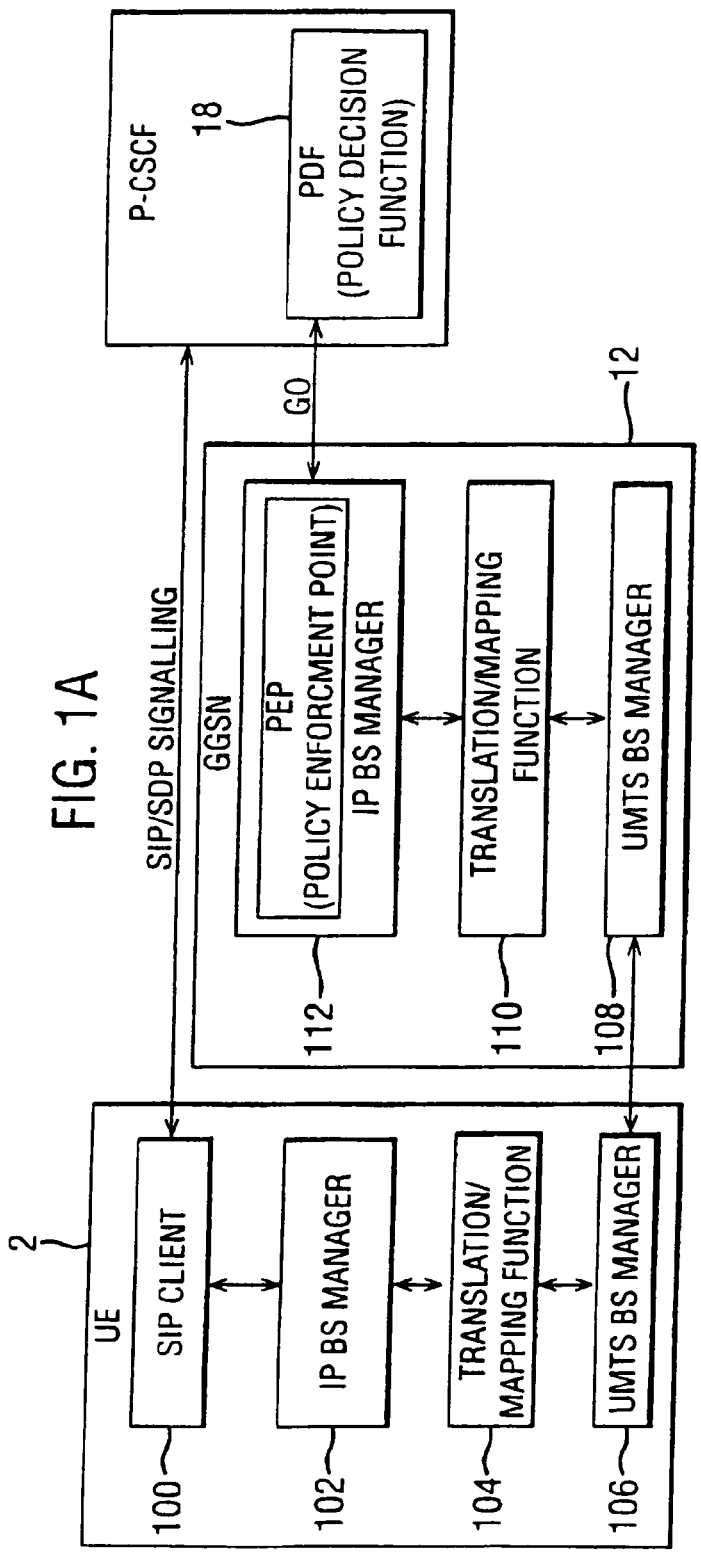
FIG. 1A illustrates the architectural elements of the scheme of FIG. 1.

FIG. 1A illustrates the relationship between the different functional entities, but with the omission of the network elements which are not involved in service-based local policy (in particular radio network controller RNC and the serving gateway support node SGSN). FIG. 1A indicates that the user equipment 2 includes an SIP client 100, an IP Bearer Service (IPBS) manager 102, a translation/mapping function 104 and a UMTS Bearer Service (UMTSBS) manager 106. The UMTSBS manager 106 is in connection with the GGSN 12 by way of its own UMTSBS manager 108. The GGSN 12 also includes a translation/mapping function and an IPBS manager 112 with a policy enforcement point. The policy-enforcement point is in connection with the policy decision function 18 forming part of the P-CSCF node in one embodiment.

Figure 2:
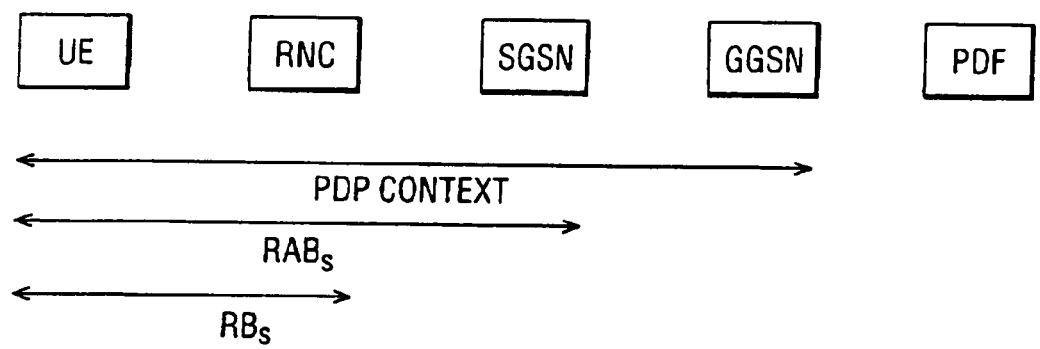
FIG. 2 is a schematic diagram illustrating the logical semantics of communication pathways in the network.

The communications semantics across the nodes of the network illustrated in FIG. 1 are shown in FIG. 2. Overall communication between user equipment 2 and the GGSN 12 is provided by a PDP context. Each PDP context provides a communication pathway between a particular user equipment 2 and the gateway GPRS support node 12 and, once established, can carry multiple traffic flows. Each traffic flow represents for example a particular service or a media component of a particular service. The PDP context therefore represents a logical communication pathway for one or more traffic flows across the network. To implement the PDP context between user equipment 2 and the SGSN 8, a radio access bearer RAB is established which allows for data transfer across the radio bearer 6 and the Iu interface 10. The physical channels established between the user equipment 2 and the radio network controller 4 are referred to as radio bearers RB. The implementation of these logical and physical channels is known and is therefore not discussed further herein.

In existing systems, multiple traffic flows within a PDP context are all treated in the same manner based on PDP context attributes, such as quality-of-service (QoS) or charging treatment. The possibility exists to create a secondary PDP context at the user equipment so that certain traffic flows from the user equipment can be treated differently in their transmission across the network. For example, there are a number of quality-of-service traffic classes applying to traffic flows of differing kinds: conversational, streaming, interactive and background. Depending on the nature of the data to be transmitted across the network, the appropriate quality-of-service is requested by the user equipment 2 and is authorized by the network.

Figure 2A:
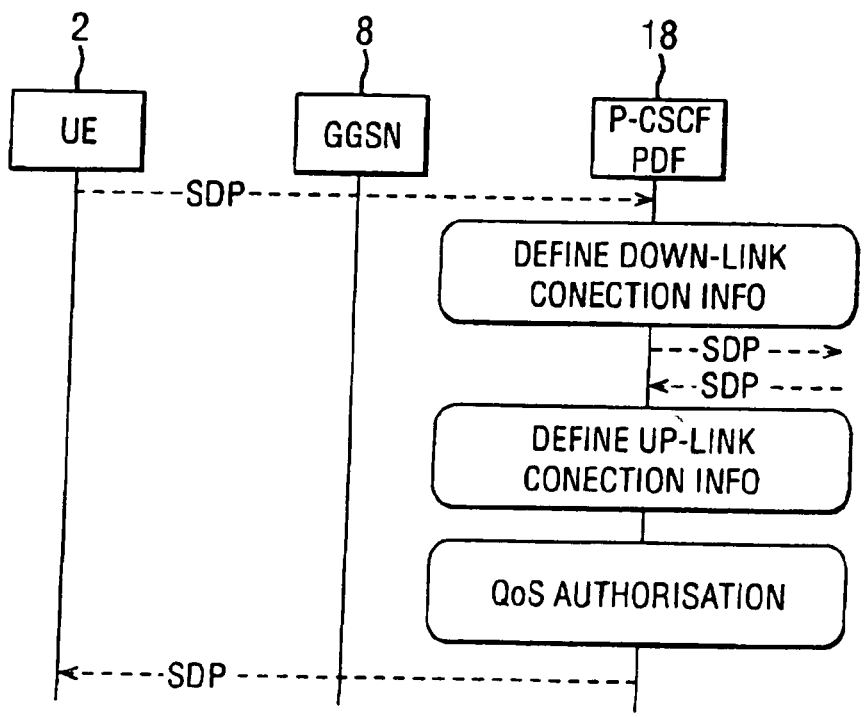
FIG. 2A is a diagram illustrating authorization of resources at the PDF.

By way of background, reference is made to FIG. 2A which is a schematic diagram illustrating the authorization of QoS resources at an originating PDF.

For example, at session setup, the PDF 18 obtains information from the SDP parameters defined by the originator and identifies the connection information needed (for example IP address of the downlink media flow, media ports to be used etc.). The PDF 18 obtains information from the negotiated SDP parameters from the terminating side. The PDF 18 then identifies the connection information needed to define the uplink connection. Information from the SDP parameters is used by the PDF 18, in order to define the QoS resource authorization. The PDF 18 authorizes each media component negotiated for the session which is expressed in terms of IP QoS parameters. An authorization token is generated by the PDF and sent to the UE via the P-CSCF.

Figure 3:
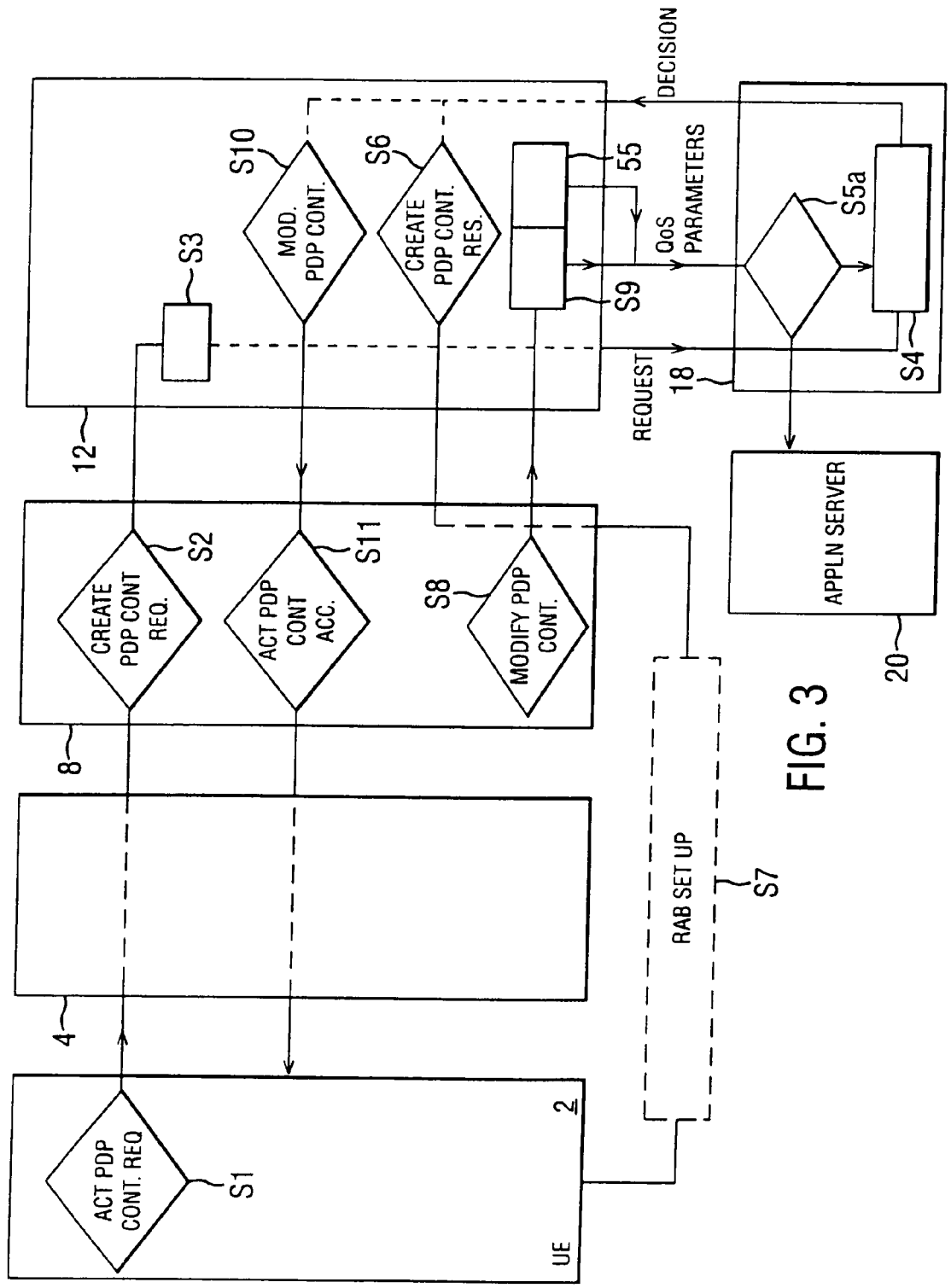
FIG. 3 is a schematic functional diagram of an embodiment of the invention.

FIG. 3 is a schematic diagram illustrating an embodiment of the invention which allows the PDF 18 to have more information about the available QoS across the network. The user equipment 2 generates (step S1) a request for activating a PDP context across the network, identifying a requested QoS. In case of IMS services, the request includes an authorization token and, in this embodiment, two traffic flow identifiers FLOW1 and FLOW2. This request is carried from the user equipment UE to the SGSN 8. The SGSN 8 creates (step S2) a PDP context request for transmission to the GGSN 12 which itself creates a request (step S3) to the PDF 18. The PDF 18 returns a decision (step S4) to the GGSN 12 defining a packet classifier for each flow to identify the flow in the network with the attributes of each of the flows, FLOW1 and FLOW2. At this point, the GGSN 12 reports the negotiated QoS attributes of the network to the PDF 18, at step S5. The negotiated QoS attributes may contain e.g. the QoS class, the guaranteed bitrate and the max bitrate. The guaranteed and max bitrates may be indicated both for uplink and downlink direction. These QoS attributes may be considered as IP QoS attributes. As another example, the negotiated QoS attributes may contain UMTS specific QoS attributes, such as the traffic class, the traffic handling priority, the allocation/retention priority, the guaranteed bitrate and the max bitrate. The guaranteed and max bitrates may be indicated both for uplink and downlink direction. The PDF 18 processes the information on the negotiated QoS attributes at step S5*a* before sending them to an application server/proxy 20 to determine the treatment of traffic flows based on the negotiated QoS attributes. For example, the PDF 18 may decide to divide the PDP context QoS attributes into traffic flow specific QoS attributes. The PDF may also decide to drop some of the traffic flows e.g. if the negotiated QoS attributes are not sufficient for all the traffic flows. In effect, the decision issued by the PDF 18 can be modified by the QoS attribute processing step at S5*a*. The decision which is returned in step S4 by the PDF 18 causes the GGSN 12 to create the PDP context response at step S6. The SGSN 8 then establishes the PDP context for the traffic flows setting up a radio access bearer as indicated in step S7. It is possible that the SGSN 8 or RNC 4 modifies the QoS attributes due to the network environment. According to the described embodiment of the invention, this is reported by the SGSN 8 to the GGSN 12 at step S8 in a step to modify the PDP context. The GGSN reports the modified QoS parameters to the PDF 18 at step S9 (shown with reporting step S5 in FIG. 3, because it is similar to the reporting step S5) and the PDF 18 can then take steps to cause different traffic flow treatment, for example to divide the modified QoS into traffic flow specific QoS attributes. As an example, FLOW1 requires 20 kbps as the max bitrate and FLOW2 requires 10 kbps as the max bitrate. If the modified QoS attributes indicate only support of 15 kbps as the max bitrate, this max bitrate should be divided between the two flows. The PDF could thus allocate 10 kpbs (20/(20+10)=2/3) to FLOW1 and 5 kpbs (10/(20+10)=1/3) to FLOW2. The PDF may also decide to drop some of the traffic flows if the modified QoS attributes are not sufficient for all the traffic flows. This step of determining the flow treatment is similar to the step for determining the flow treatment already mentioned above for negotiated QoS attributes and thus is illustrated in FIG. 3 as the same step S5*a*. A new decision issued by the PDF 18 causes a modified PDP context response to be created at the GGSN as in step S10. If some of the traffic flows were dropped by the PDF 18, the new decision may contain information about the remaining traffic flows or as an alternative about the dropped traffic flows. In response to the modified PDP context request issued by the GGSN 12, the SGSN 8 activates a PDP context acceptance to the UE 2 as indicated at step S11.

FIG. 3 describes how the GGSN can inform the PDF and how the PDF can inform the application server/proxy about the negotiated QoS attributes. As an alternative, the GGSN may communicate with the application server/proxy directly. In this case, there is no PDF in between.

Figure 4:
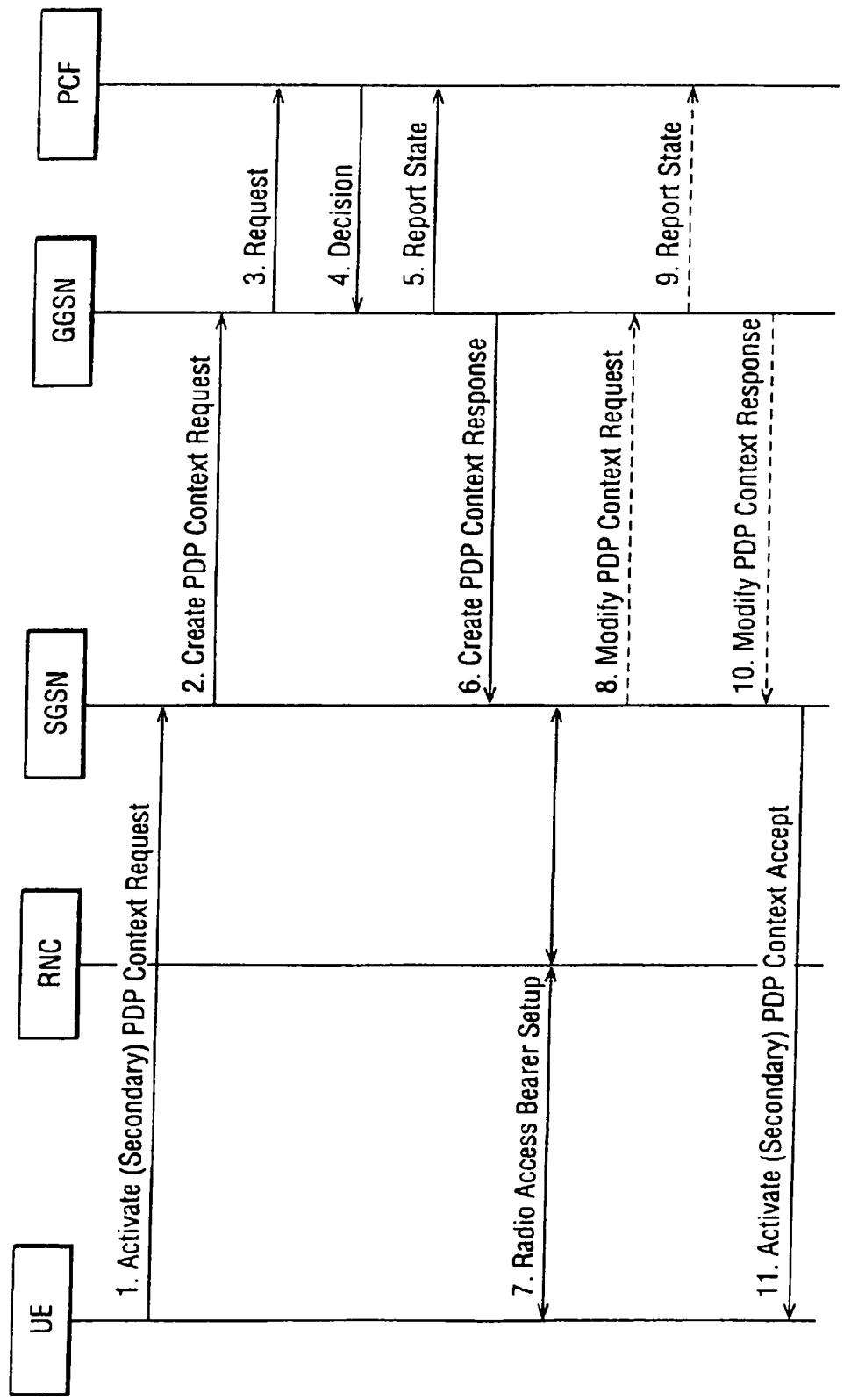
FIG. 4 is a schematic functional diagram illustrating the logical semantics of the embodiment of FIG. 3.

FIG. 4 shows the sequence described above in more diagrammatic format.

Furthermore, as described above, the PDF 18 informs the application server/proxy 20 about the negotiated QoS attributes for the traffic flows carried by the PDP context. If the PDF 18 sends information to the application proxy, the application proxy transfers the information to the application server. In this way, the application server is aware of what are the negotiated QoS attributes of a traffic flow related to the PDP context. The application server may adjust its configuration for sending or receiving traffic flows. This will optimize the QoS efficiency, avoiding packet losses in the network and providing better quality for the user.

The application server/proxy may receive the negotiated QoS attributes also from other sources than the PDF, e.g. from the UE. If the application server/proxy receives the negotiated QoS attributes from the multiple sources, the application server/proxy decides which set of negotiated QoS attributes to take into account if the sets of negotiated QoS attributes differ from each other. If the UE can send the negotiated QoS attributes to the application server/proxy, it may indicate this to the GGSN, in which case, there is no need to send the negotiated QoS attributes from the GGSN to the PDF and from the PDF to the application server/proxy. As an alternative, the GGSN may send the negotiated QoS attributes to the PDF but also indicate that there is no need to send the negotiated QoS attributes to the application server/proxy. If the GGSN can send the negotiated QoS attributes towards the application server/proxy via the PDF, the GGSN may indicate this to the UE, and thus there is no need to send the negotiated QoS attributes from the UE to the application server/proxy.

The principles of the invention described herein can be used to enhance Multimedia Broadcast/Multicast Services (MBMS). QoS negotiation is applicable for MBMS services because the UE cannot ask for the required QoS attributes and there is the possibility of dropping the service if all the network nodes don't negotiate the QoS.

Also Multiple QoS streams of a media component for a single MBMS service have been proposed where the clients can choose the appropriate quality level. The disadvantages of this proposal is that if different media components are separated and provided with different QoS profiles, then each component for a single MBMS service will require separate PDP contexts and tunnels for transmission. This is not efficient in MBMS if all the nodes don't support QoS and the resources cannot be reserved beforehand. Also the Traffic Handling Priority cannot be used for background and streaming classes, instead Allocation/Retention Priority is applicable for those QoS classes.

Without QoS negotiation the RNC may not be able to provide the required QoS (the bitrate(s)) and, thus, some branches may not be established. Thus, all the UEs under that RNC are left without the MBMS service.

When knowing the negotiated QoS attributes, the PDF 18 or the application server/proxy 20 may also decide whether the negotiated QoS of PDP context is sufficient to carry a traffic flow. If the negotiated QoS of PDP context is not sufficient, the PDF 18 or the application server/proxy 20 may initiate release of the PDP context. This is particularly beneficial in case of Multimedia Broadcast/Multicast Services (MBMS). In case of MBMS services, MBMS bearers are created in the network to carry an MBMS service. MBMS bearer creation is initiated by the Broadcast/Multicast Service Center BM-SC, an application server/proxy for MBMS services. If QoS may be negotiated by the network, e.g. by the GGSN, SGSN or RNC, the negotiated QoS attributes may differ from the QoS attributes requested by the BM-SC. If those differ, the PDF or BM-SC can decide, whether the negotiated QoS attributes are sufficient for the MBMS service. If the negotiated QoS attributes are not sufficient for the MBMS service, the PDF or BM-SC may initiate release of the MBMS bearer. In case of an MBMS service, multiple MBMS bearers may be created in the network, in which case, multiple sets of negotiated QoS attributes may be indicated to the PDF or BM-SC. If some of those sets is not sufficient for the MBMS service, the PDF or BM-SC may initiate release of those particular MBMS bearers.

The PDF has information for the traffic flows carried by the PDP context in the form of QoS attributes. As described above, the PDF can implement intelligent logic for dealing with cases when the requested QoS is very different (for example higher) than the negotiated QoS. As described above, this internal logic may be applied e.g. for PDP contexts and for MBMS bearers. For example, in the above case where the negotiated max bitrate of the PDP context is only 15 kbps, the PDF 18 may decide to drop one of the traffic flows, FLOW1 or FLOW2, and leave only one of them, based on service and operator information for the traffic flows. The logic in the PDF may be operator configurable. The operator may prefer not to provide a specific service under a specified QoS limit (for example, do not provide streaming news from a news information source if the guaranteed bitrate falls below the limit of 10 kbps). If the PDF has performed some action due to operator policy on the negotiated QoS, then the PDF can inform the application server/proxy 20 about that. The PCF informs also the GGSN 12 about that and the GGSN may indicate the accepted/dropped traffic flows to the UE 2.

There follows a more detailed discussion of the application of negotiated QoS to MBMS, with two examples of negotiation solutions: (i) Multiple negotiated QoS and (ii) One negotiated QoS In the case of multiple negotiated QoS, the QoS supported in each branch of the MBMS service can be different (have different bitrate value). Otherwise the service is similar to the One negotiated QoS.

In the case of One negotiated QoS, the QoS supported by each branch of the MBMS distribution tree will be the same. All the nodes can propose a QoS value suitable for them, and the dropping of the service is less likely.

Figure 5:
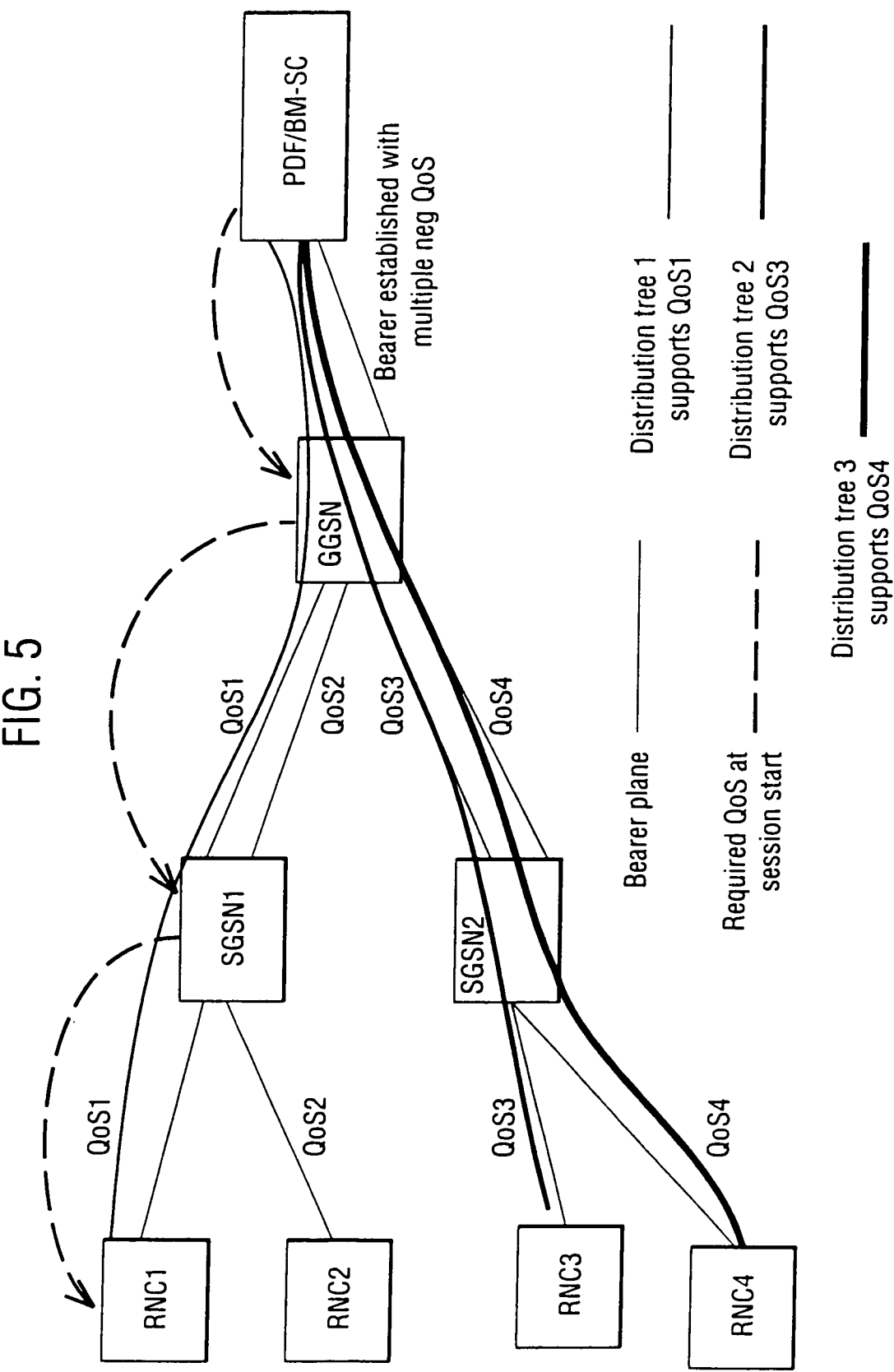
FIG. 5 is a schematic diagram illustrating QoS negotiation with multiple negotiated QoS.

FIG. 5 illustrates one embodiment for the multiple negotiated QoS. Considering the network scenario in FIG. 5, it is possible that SGSNs will decide to accept all the QoSs requested/negotiated by RNCs. In other words, different QoS values can be used for one MBMS session. As shown in FIG. 5, MBMS bearer establishment for multiple negotiated QoS may proceed according to the following discussion. According to a first step of the multiple negotiated QoS, the PDF/BM-SC sends the required QoS to the nodes (GGSNs, SGSNs, RNCs) in the distribution tree.

According to a second step of the multiple negotiated QoS, the RNC1 and RNC2 can support QoS1 and QoS2, respectively, and send this info to SGSN1 as MBMS bearer establishment request if this has not already been done. If the SGSN1 can accept QoS1 for RNC1 and QoS2 to RNC2, SGSN1 sends an MBMS Bearer Request message to the GGSN with those QoS value(s). However, if the SGSN1 cannot support QoS1 and/or QoS2 it can send the negotiated QoS value(s) it is able to support to GGSN. Note that the QoSs selected by the SGSN1 are either the same or lower than the requested QoSs by RNCs under it and the required QoS originally requested by the PDF/BM-SC in step 1 of the multiple negotiated QoS.

According to a third step of the multiple negotiated QoS, if the GGSN can accept the QoS value(s) received from SGSN1, it sends the Bearer Request message to the BM-SC with these QoS value(s). However, if the GGSN cannot accept the QoS received from the SGSN1, it can send to the PDF/BM-SC the negotiated QoS value(s) it is able to support. Note that the QoS selected by the GGSN is either the same or lower than the requested QoSs by SGSN1 under it and the required QoS originally requested by the PDF/BM-SC in step 1 of the multiple negotiated QoS.

According to a fourth step of the multiple negotiated QoS, if the PDF/MB-SC can accept the QoS value(s) received from GGSN, it responds to the GGSN with negotiated QoS value(s) to establish tunnel. If BM-SC does not support some of those QoS value(s), it will not establish the bearer for those QoS value(s) towards downstream nodes. BM-SC and GGSN will establish separate tunnel for each QoS value.

According to a fifth step of the multiple negotiated QoS, the GGSN responds to the MBMS bearer request received from the SGSN1 in step 2 with QoS value(s) received from the BM-SC. SGSN1 and GGSN establish separate tunnel for each QoS value.

According to a sixth step of the multiple negotiated QoS, the SGSN1 responds to the request received from the RNC1 and RNC2 to establish the tunnels with the negotiated QoS value(s) it is able to support SGSN2, RNC3 and RNC4 also carry the second, third, fourth, fifth and sixth steps of the multiple negotiated QoS described above.

One advantage of the invention is that different Iu bearers will support different/multiple QoSs and hence less possibility to drop services when all the downlink nodes (RNC, SGSN, GGSN) already support the QoSs.

Figure 6:
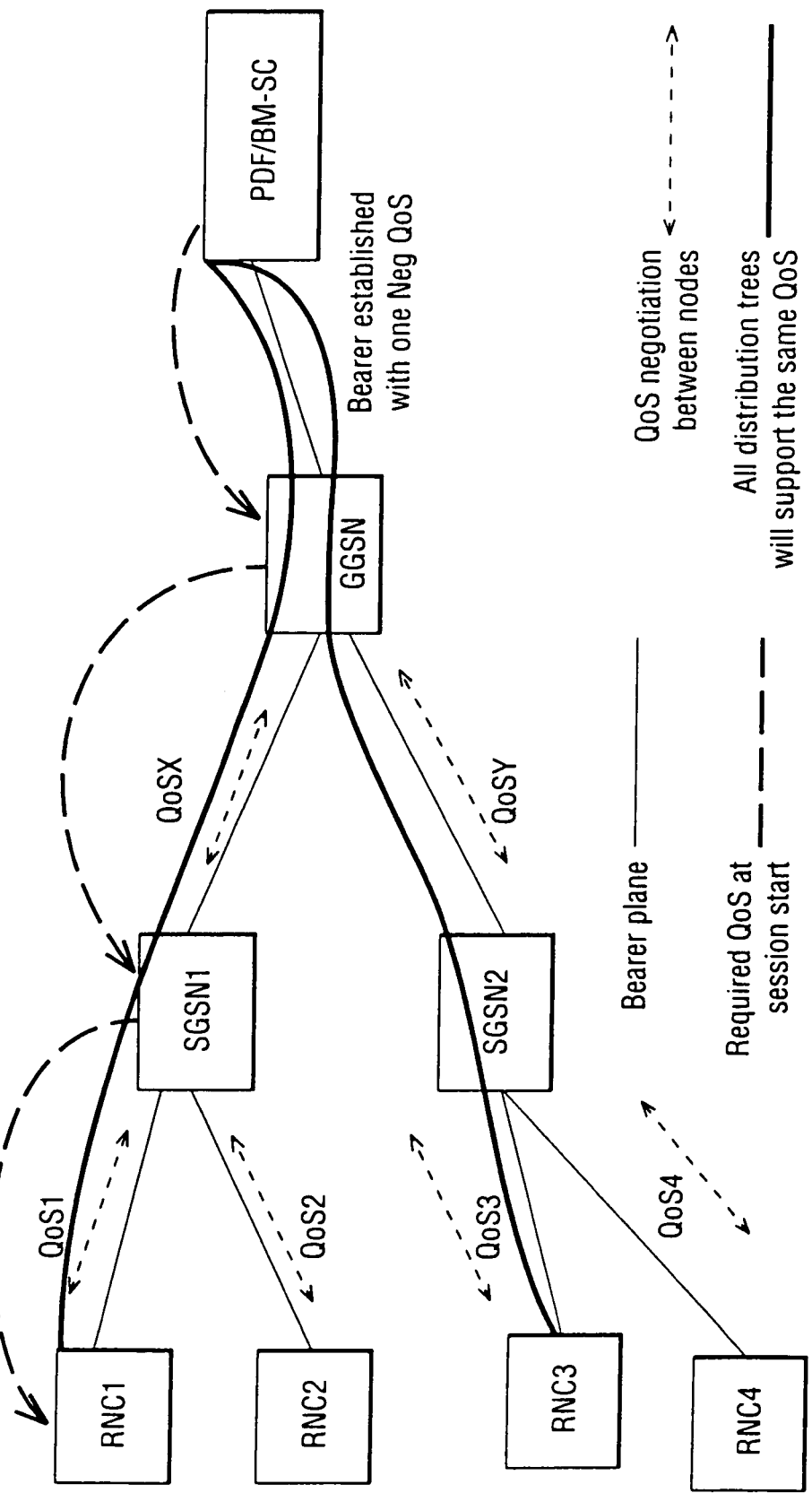
FIG. 6 is a schematic diagram illustrating QoS negotiation with one negotiated QoS.

FIG. 6 illustrates an embodiment for the One negotiated QoS. In the One negotiated QoS, the QoS is the same for each branch of the MBMS distribution tree. The QoS negotiation can be initiated by the RNC, SGSN or GGSN. In this example, the RNC initiated case is described, see FIG. 6.

MBMS bearer establishment process for one negotiated QoS may proceed according to the following discussion. First, the PDF/BM-SC sends the required QoS to the nodes (GGSNs, SGSNs, RNCs) through the distribution tree. Second, the RNC1 indicates that it supports QoS1 and RNC2 indicates that it supports QoS2 (i.e. different bitrates) as in FIG. 3, and SGSN1 decides what QoS value to accept (i.e. QoS1, QoS2). In the same way, the RNC3 supports QoS3, RNC4 supports QoS4 and SGSN2 decides what QoS value to accept (i.e. QoS3, QoS4). Based on which QoS value the nodes accept there can be two different cases.

In the first step of the first case, all RNCs (RNC1, RNC2, RNC3, RNC4), SGSNs, GGSN and BM-SC can support the QoS1. In the first case, once the SGSNs (e.g. SGSN1, SGSN2) have accepted QoS values from RNCs under them, it sends the QoSX (e.g. QoS1), QoSY (e.g. QoS3) or the negotiated QoS to the GGSN. Note, that the QoS selected by the SGSN1 is either the same or lower than QoS1, QoS2 and the required QoS originally requested by the PDF/BM-SC. Similarly QoS selected by the SGSN2 is either the same or lower than QoS3, QoS4 and the required QoS originally requested by the PDF/BM-SC. (Note, this means that 0 kbit/sec is the lowest QoS value that the SGSN can accept).

In the second step of the first case, the GGSN decides what QoS value to accept (QoSX, QoSY or negotiated QoS value)

and send it to PDF/BM-SC. If GGSN accepts the QoS (e.g. QoS1), it sends to the PDF/BM-SC. Note, that the QoS selected by the GGSN is either the same or lower than QoSx (e.g. QoS1), QoSy (e.g. QoS3), and the required QoS originally requested by the PDF/BM-SC. (Note, this means that 0 kbit/sec is the lowest QoS value that the GGSN can accept).

In the third step of the first case, if the PDF/BM-SC accepts the QoS (e.g. QoS1) received from GGSN, it then acknowledges it back to the GGSN.

In the fourth step of the first case, the GGSN sends the acknowledgement back to SGSN1 and SGSN2. If both SGSNs (SGSN1, SGSN2) can support or negotiate the QoS1 acknowledged by the GGSN and PDF/BM-SC, SGSN1 and SGSN2 will acknowledge it back to the RNCs under them.

Figure 7:
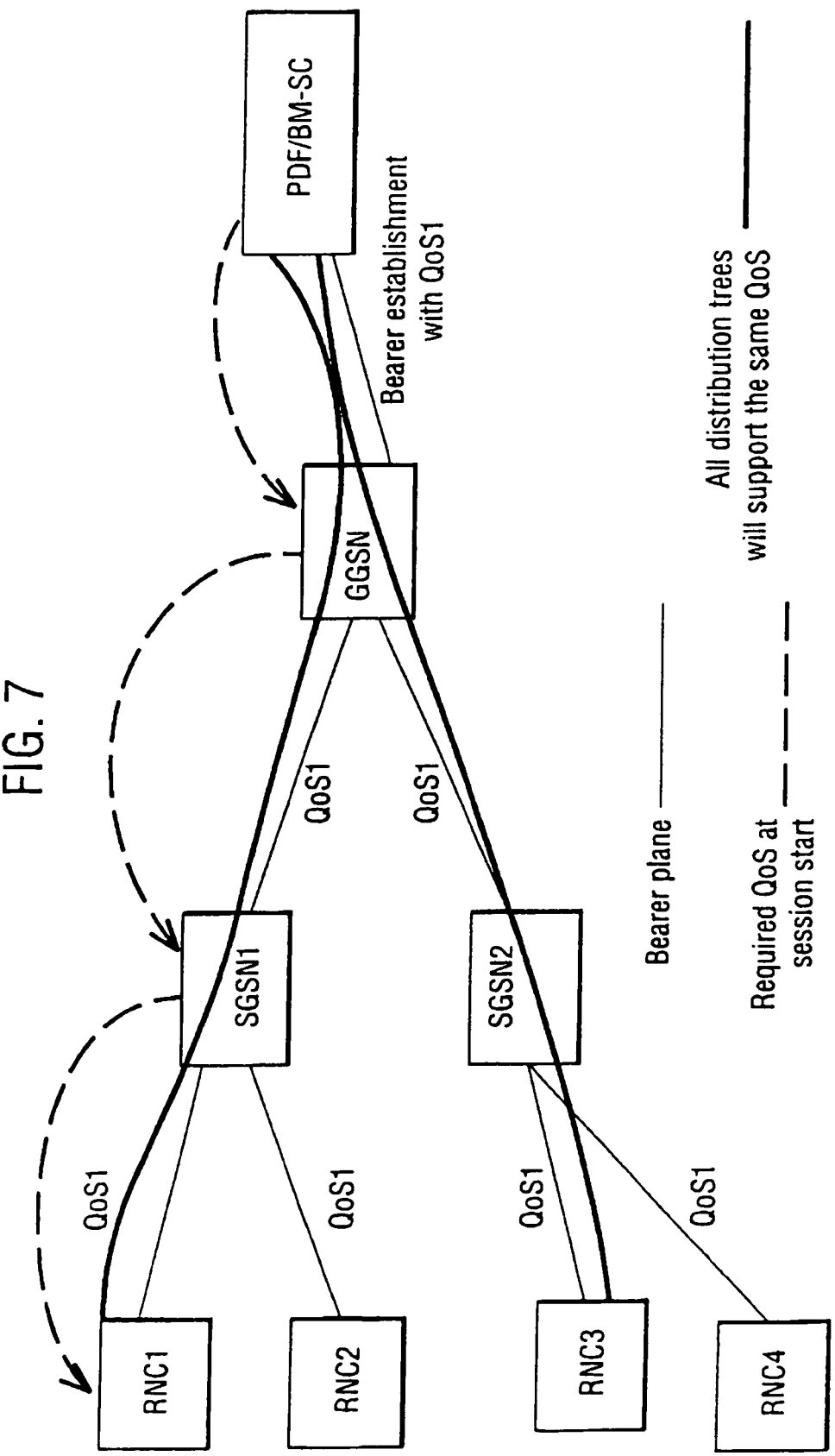
FIG. 7 is a schematic diagram illustrating bearer establishment when all distribution trees support the requested QoS.

In the second case, if the GGSN, SGSNs, RNCs can accept or negotiate the QoS1 then bearer will be established as in FIG. 7. In the second case, one RNC (RNC1) can support the QoS1, but the other RNC (RNC2) cannot. In this case the QoS2 is lower than QoS1. SGSN1 sends the QoS (QoS1, QoS2 or negotiated QoS) to GGSN. Similarly RNC (RNC3) can support the QoS1, but the other RNC (RNC4) cannot, in this case the QoS4 is lower than QoS1. SGSN2 sends the QoS (QoS3, QoS4 or negotiated QoS) to GGSN.

The second case may include a first step wherein, once the SGSNs (e.g. SGSN1, SGSN2) have accepted QoS values from RNCs under them, it sends the QoSX (e.g. QoS1), QoSY (e.g. QoS3) or the negotiated QoS to the GGSN. Note, that the QoS selected by the SGSN1 is either the same or lower than QoS1, QoS2 and the required QoS originally requested by the PDF/BM-SC. Similarly QoS selected by the SGSN2 is either the same or lower than QoS3, QoS4 and the required QoS originally requested by the PDF/BM-SC. (Note, this means that 0 kbit/sec is the lowest QoS value that the SGSN can accept).

The second case may include a second step wherein the GGSN decides what QoS value to accept (QoSX, QoSY or negotiated QoS value) and send it to PDF/BM-SC. If GGSN accepts the QoS (e.g. QoS1), it sends to the PDF/BM-SC. Note, that the QoS selected by the GGSN is either the same or lower than QoSx (e.g. QoS1), QoSy (e.g. QoS3), and the required QoS originally requested by the PDF/BM-SC. (Note, this means that 0 kbit/sec is the lowest QoS value that the GGSN can accept).

The second case may include a third step wherein, if PDF/BM-SC accepts the QoS (e.g. QoS1) received from GGSN, it then acknowledges it back to the GGSN.

The second case may include a fourth step wherein the GGSN sends the acknowledgement back to SGSN1 and SGSN2. If both SGSNs (SGSN1, SGSN2) can support or negotiate the QoS1 acknowledged by the GGSN and PDF/BM-SC, SGSN1 and SGSN2 will acknowledge it back to the RNCs under them.

Figure 8:
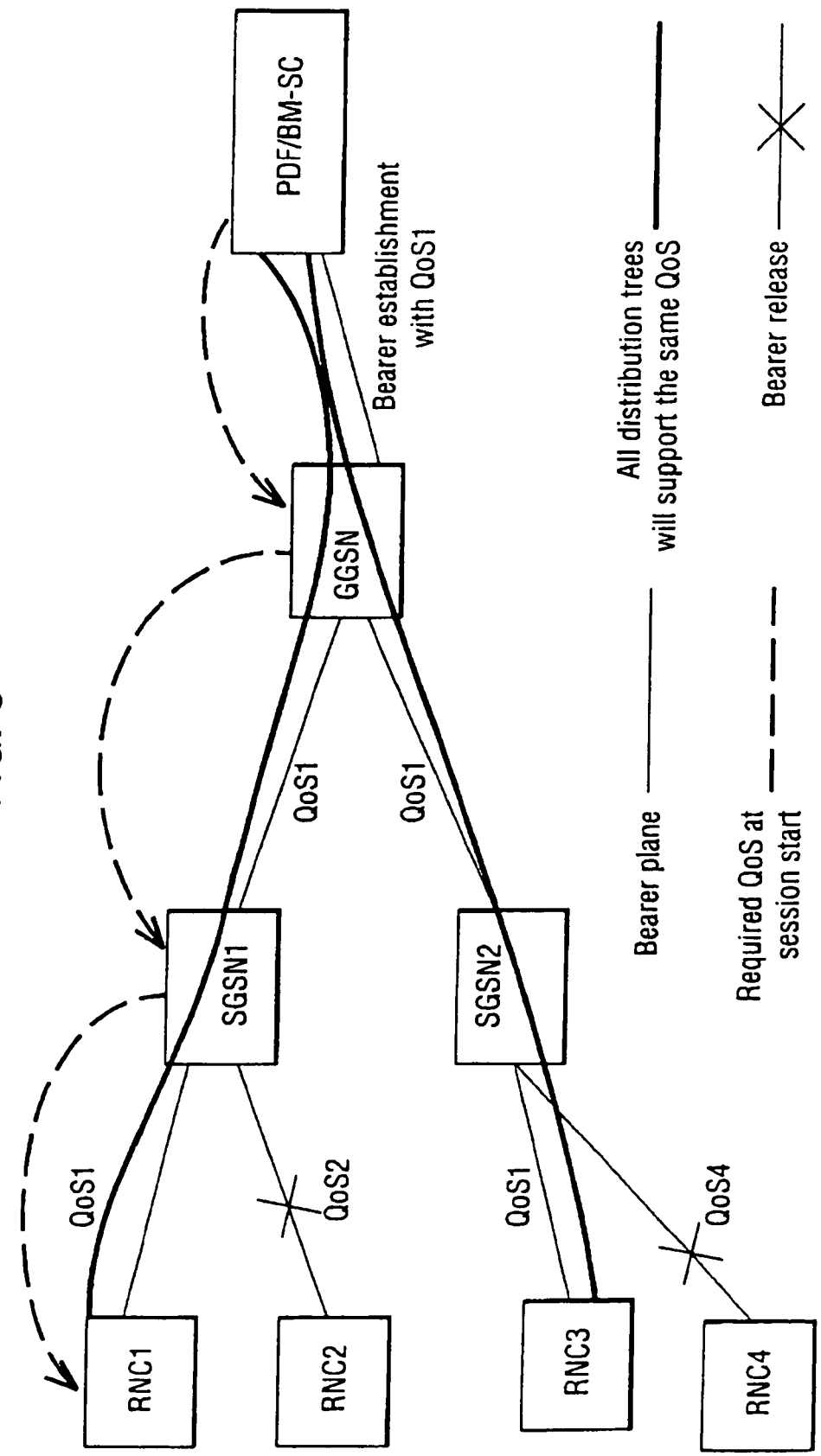
FIG. 8 is a schematic diagram of establishment of a bearer with the requested QoS, with other bearers with different QoS's having been released.

The second case may include a fifth step wherein RNC1 already supports the QoS1 acknowledged by the PDF/MB-SC, GGSN and SGSN1, but RNC2 doesn't. Similarly, RNC3 can negotiate QoS1 but RNC4 doesn't. So bearer will not be established between SGSN1, RNC2 and RNC4, SGSN2. Bearer will be established between nodes that support QoS1 as in FIG. 8.

If there are several GGSNs involved in the MBMS session then a QoS negotiation as described above in the second, third and fourth steps of the second case can be applied if the GGSNs accept different QoS values.

Note, that in the normal case all the nodes can accept the required QoS originally requested by the PDF/BM-SC. So, the negotiation principle described above is only used in the special cases when there is congestion in the network.

One advantage of the invention is that there is less of a possibility to drop the service when all the downlink nodes (RNC, SGSN, GGSN) already support the negotiated QoS.

Figure 9:
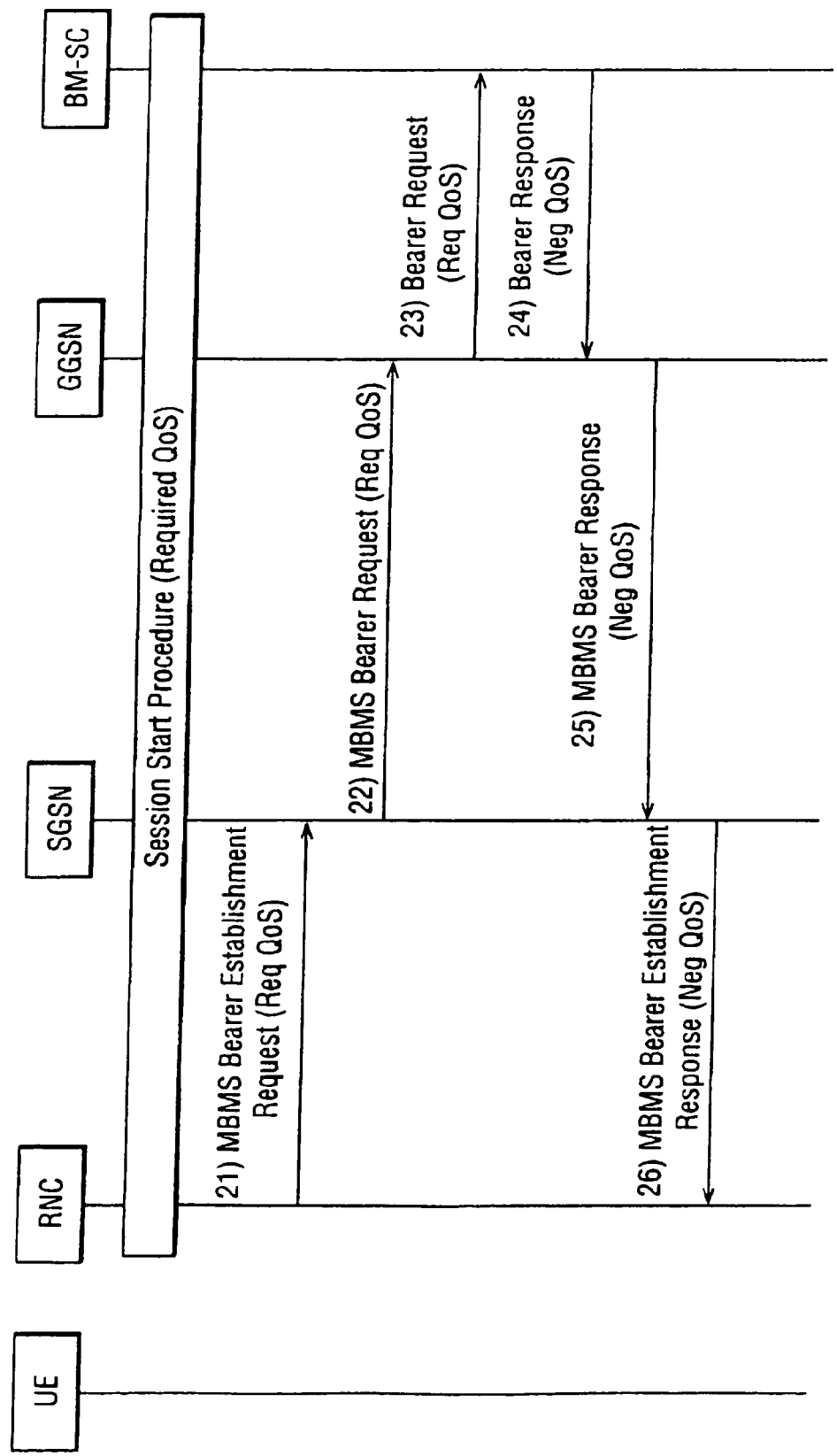
FIG. 9 is a schematic functional diagram illustrating the logical semantics of the embodiment of FIGS. 5 to 8.

The signalling flow of the QoS negotiation describes a general signaling flow of QoS negotiation for one negotiated QoS and for multiple negotiated QoS as shown in FIG. 9. The Session Start Procedure carries the Required QoS from BM-SC towards downlink nodes (GGSN, SGSN and RNC)

In step 21 of FIG. 9, required QoS is carried from RNC to SGSN through MBMS Bearer establishment Request message. If RNC cannot accept the required QoS, then RNC can downgrade the QoS at this stage and send the downgraded QoS to SGSN. SGSN will wait until all RNCs join the SGSN with the negotiated QoS.

In step 22 of FIG. 9, if SGSN can support the QoS received from RNCs, the SGSN will send the QoS through MBMS bearer Request message to GGSN. Downgrade of QoS is possible at SGSN and the SGSN will send the Negotiated QoS to GGSN.

In step 23 of FIG. 9, after GGSN receives the Bearer Request from SGSN with the Requested QoS, it will request for bearer establishment to the PDF/BM-SC or joins an existing one, if available, for this MBMS service with the negotiated QoS. It is possible to downgrade the QoS at the GGSN.

In step 24 of FIG. 9, if QoS negotiation is accepted by PDF/BM-SC, it will send the bearer response to the GGSN. If PDF/BM-SC does not support the negotiated QoS, then it releases the bearer at that branch.

In step 25 of FIG. 9, if GGSN accepts the QoS from PDF/BM-SC, it will send the MBMS Bearer Response to the SGSN with the negotiated QoS.

In step 26 of FIG. 9, SGSN will send the MBMS Bearer establishment Response towards RNC if SGSN accepts the QoS received from SGSN.

We claim:

1. A method comprising:
receiving, at a gateway node, a request for establishing a communication pathway end-to-end over a network, wherein the communication pathway includes a radio communication channel and a packet communication channel, wherein the request comprises a secondary packet data protocol context request including a plurality of flow information identifying a plurality of traffic flows to be carried by the communication pathway, wherein the request further includes quality-of-service attributes associated with the plurality of traffic flows, wherein at least one of the plurality of traffic flows is associated with at least one of the plurality of quality-of-service attributes determining a quality-of-service requirement for the at least one of the plurality of traffic flows;
negotiating, based on the received request comprising the secondary packet data protocol context request and the at least one of the plurality of quality-of-service attributes, between the gateway node and a policy decision function node, a first quality-of-service;
reporting, by the gateway node, to at least one of the policy decision function node, an application server, and an application proxy, the negotiated first quality-of-service;
receiving, at the gateway node, a decision sent by the policy decision function node, wherein the decision drops a first traffic flow from the plurality of traffic flows, when the negotiated first quality-of-service accommodates a subset of the plurality of traffic flows, wherein the decision includes information about the dropped first traffic flow; and sending, from the gateway node, a modified secondary packet data protocol context request based on the decision.

2. The method according to claim 1, wherein the reporting comprises reporting the negotiated quality-of-service from the gateway node to the policy decision function node of the network and reporting the negotiated quality-of-service from the policy decision function node to the at least one of the application proxy and the application server.

3. The method of claim 2, wherein the gateway node is implemented as a general packet radio service gateway support node.

4. The method according to claim 1, wherein the quality-of-service attributes are for a multimedia broadcast/multicast service.

5. The method according to claim 1, further comprising:
establishing the communication pathway based on the negotiated first quality-of-service.

6. The method according to claim 5, wherein the establishing comprises establishing the communication pathway as a packet data protocol context over the network.

7. The method according to claim 5, wherein the establishing the communication pathway comprises establishing a radio bearer providing the negotiated first quality-of-service between at least one user terminal and at least one radio network node.

8. A method according to claim 5, wherein the establishing the communication pathway comprises establishing a radio access bearer providing the negotiated first quality-of-service between a user terminal and a serving general packet radio service node.

9. The method according to claim 1, wherein the policy decision function node divides the quality-of-service attributes into traffic flow specific quality-of-service attributes.

10. An apparatus, comprising:
a receiver, at a gateway node, configured to receive a request for establishing a communication pathway end-to-end over a network, wherein the communication pathway includes a radio communication channel and a packet communication channel, wherein the request includes a plurality of flow information identifying a plurality of traffic flows to be carried by the communication pathway, wherein the request further includes quality-of-service attributes associated with the plurality of traffic flows, wherein at least one of the plurality of traffic flows is associated with at least one of the plurality of quality-of-service attributes determining a quality-of-service requirement for the at least one of the plurality of traffic flows, wherein the receiver is further configured to receive, at the gateway node, a decision sent by a policy decision function node, wherein the decision drops a first traffic flow from the plurality of traffic flows, when a negotiated first quality-of-service ice accommodates a subset of the plurality of traffic flows, wherein the decision includes information about the dropped first traffic flow;
a negotiator configured to negotiate, based on the at least one of the plurality of quality-of-service attributes, the first quality-of-service for the at least one of the plurality of traffic flows;
a reporter, at the gateway node, configured to report, to at least one of the policy decision function node, an application server, and an application proxy, the negotiated first quality-of-service for the at least one of the plurality of traffic flows; and a transmitter, at the gateway node, configured to send a modified secondary packet data protocol context request based on the decision.

11. The apparatus according to claim 10, wherein the reporter is configured to report the negotiated first quality-of-service to at least one of the application proxy and the application server via the policy decision function node.

12. The apparatus according to claim 10, further comprising a unit for supporting a multimedia broadcast/multicast service.

13. The apparatus according to claim 10, further comprising an establishing unit configured to establish the communication pathway based on the negotiated first quality-of-service.

14. The apparatus according to claim 13, wherein the establishing unit for establishing the communication pathway includes a unit for establishing a packet data protocol context across the network.

15. The apparatus according to claim 13, wherein the establishing unit for establishing the communication pathway includes a unit for establishing a radio bearer in the radio communication channel.

16. The apparatus according to claim 13, wherein the establishing unit for establishing the communication pathway comprises a unit for establishing a radio access bearer in the radio communication channel.

17. An apparatus according to claim 10, further comprising an establishing unit configured to establish the communication pathway is based on the negotiated first quality-of-service.

18. The apparatus according to claim 10, wherein the policy decision function node divides the quality-of-service attributes into traffic flow specific quality-of-service attributes.

19. An apparatus, comprising:
a receiver, at a policy decision function node, configured to receive, from a gateway, negotiated quality-of-service attributes for a plurality of traffic flows to be carried by an end-to-end communication pathway over a network, the plurality of traffic flows identified by a plurality of flow information; and
a processor, at the policy decision function node, configured to determine, based on the received negotiated quality-of-service attributes, a quality-of-service treatment of the plurality of traffic flows, wherein the quality-of-service treatment includes a decision to drop a first traffic flow from the plurality of traffic flows, when the negotiated quality-of-service attributes accommodate a subset of the plurality of traffic flows, wherein the decision includes information about the dropped first traffic flow, and wherein the decision causes the gateway node to send a modified secondary packet data protocol context request based on the decision.

20. The apparatus according to claim 19, wherein the processor determines the quality-of-service treatment before sending the negotiated quality-of-service attributes to an application server.

21. The apparatus of claim 19 further comprising:
a forwarder, at the policy decision function node, configured to forward the negotiated quality-of-service to at least one of an application proxy or an application server.

22. A method, comprising:
receiving, from a policy decision function node, a negotiated quality-of-service at an application proxy or an application server for a plurality of traffic flows to be carried by an end-to-end communication pathway over a network, the plurality of traffic flows identified by a plurality of flow information, wherein the receiving includes a decision by the policy decision function node to drop a first traffic flow from the plurality of traffic flows, when the negotiated quality-of-service accommodates a subset of the plurality of traffic flows, and wherein the decision includes information about the dropped first traffic flow;

adjusting, based on the received negotiated quality-of-service, a configuration of an application proxy or an application server for sending and receiving the plurality of traffic flows; and sending a modified secondary packet data protocol context request based on the decision.

23. An apparatus, comprising:
a receiver configured to receive, from a policy decision function node, a negotiated quality-of-service for a plurality of traffic flows to be carried by an end-to-end communication pathway over a network, the plurality of traffic flows identified by a plurality of flow information, wherein the receiving includes receiving a decision to drop a first traffic flow from the plurality of traffic flows, when the negotiated quality-of-service accommodates a subset of the plurality of traffic flows, and wherein the decision includes information about the dropped first traffic flow;

an adjuster configured to adjust, based on the received negotiated quality-of-service, a configuration of the apparatus for sending and receiving the plurality of traffic flows; and a transmitter configured to send a modified secondary packet data protocol context request based on the decision.

24. The apparatus according to claim 23, wherein the apparatus is a multimedia broadcast/multicast service server.

25. A method comprising:
receiving, at a policy decision function node from a gateway, negotiated quality-of-service attributes for a plurality of traffic flows to be carried by an end-to-end communication pathway over a network, the plurality of traffic flows identified by a plurality of flow information;

determining, based on the received negotiated quality-of-service attributes, at the policy decision function node, a quality-of-service treatment of the plurality of traffic flows, wherein the quality-of-service treatment includes a decision to drop a first traffic flow from the plurality of traffic flows, when the negotiated quality-of-service attributes accommodate a subset of the plurality of traffic flows, wherein the decision includes information about the dropped first traffic flow, and wherein the decision causes the gateway node to send a modified secondary packet data protocol context request based on the decision.

26. The method of claim 25 further comprising:
forwarding, at the policy decision function node, the negotiated quality-of-service attributes to at least one of an application proxy or an application server.

* * * * *